Patented Dec. 11, 1951

2,578,214

UNITED STATES PATENT OFFICE 2,578,214

DRYING OIL COMPOSITION

James P. West, Westmont, Ill., assignor to Universal Oil Products Company, Chicago, Ill., a corporation of Delaware No Drawing. Application December 31, 1948, Serial No. 68,752

8 Claims. (Cl. 106—285)

This invention relates to a composition of matter useful as a drying oil in coating compositions, such as paints, varnishes, lacquers, etc., consisting essentially of hydrocarbons, one component of which is a naturally drying mixture of highly olefinic, cyclic hydrocarbons containing conjugated and non-conjugated olefinic unsaturation recovered from a sludge formed in a conjunct polymerization reaction and another hydrocarbon component comprising polyolefinic, high molecular weight, normally non-drying mixture of hydrocarbons in which the unsaturation is non-conjugated. More specifically, the invention concerns a mixture of hydrocarbon oils, one component thereof consisting of a class of polyolefinic hydrocarbons which do not normally undergo oxidative drying to form a protective coating upon exposure in a thin film to atmospheric oxygen and another component consisting of hydrocarbon conjunct polymers containing a relatively large number of conjugated double bonds per molecule which on the other hand, undergo extensive oxidative drying to form brittle, non-adherent films upon exposure of the oil in a thin film to atmospheric oxygen.

It has been generally recognized in the art that certain types of hydrocarbons, characterized broadly as high molecular weight compounds containing a relatively large number of unsaturated bonds per molecule, preferably in conjugated relationship to each other, undergo the so-called "drying" transformation upon exposure of the oil as a thin film to atmospheric oxygen, forming a tack-free coating which may vary from a tough, adherent film desired in the product for such purposes to an undesirable, brittle, flaky film depending upon the structure, molecular weight, and molecular composition of the drying oil product. The mechanism of the "drying" reaction has been considered to be one of combined co-polymerization and oxidation of the individual hydrocarbon components of the drying oil mixture and the possible formation of peroxidic oxygen linkages between the individual molecules of the hydrocarbon drying oils, the mechanism being similar in many respects to the oxidative reactions involved in the drying of the familiar unsaturated fatty acid glyceride drying oils. One of the principal sources of hydrocarbon drying oils has been the mixture of high molecular weight, polyolefinic, cyclic hydrocarbons, containing conjugated unsaturation recovered from certain catalyst sludges formed in a conjunct polymerization reaction. The mixture of conjunct polymer hydrocarbons recovered from the catalyst sludges formed in the conjunct polymerization reaction by special methods of decomposing the catalyst-hydrocarbon complexes contained in said sludges as hereinafter described, have average molecular weights of from about 300 to about 450, contain from about 2.5 to about 4 olefinic double bonds per molecule of which about 70% are in conjugated relationship to each other and contain cyclic and polycyclic non-aromatic hydrocarbon components, the cyclic portions of the hydrocarbon molecules having a cyclopentenyl structure. The conjunct polymer hydrocarbon oils dry rapidly upon exposure to atmospheric oxygen, but their greatest deficiency as drying oils is their tendency to form brittle, flaky, or non-adherent films on drying which have little resistance to abrasion and which turn yellow upon ageing. This invention concerns a drying oil composition containing a mixture of said polyolefinic cyclic hydrocarbons or conjunct polymers in admixture with polyolefinic hydrocarbon components which, in themselves, are non-drying but when incorporated in admixture with the conjunct polymers, modify the drying properties of the latter and result in the formation of a tough, adherent film upon exposure of the composition or mixture to atmospheric oxygen. The ultimately dried film obtained from the present composition, is, moreover, non-tacky and completely dry to the touch, a property not possessed by the modifying component individually. The conjunct polymer hydrocarbon drying oil modifier in the composition is believed to so alter the oxidation and polymerization tendencies of the conjuct polymer hydrocarbons that formation of the solid resinous and/or crystalline products obtained on drying said conjunct polymers individually do not form. The modifying component may also contribute a plasticizing effect to the dried film of conjunct polymers, resulting in a tougher, more-adherent film, not characteristic of the film formed by drying the conjunct polymer hydrocarbons individually. It is also known that upon exposure of a mixture of said conjunct polymers containing conjugated and non-conjugated unsaturation to atmospheric oxygen, the hydrocarbons undergo oxidation and polymerization to resinous products consisting of dimers of the original conjunct polymer hydrocarbon molecules linked by peroxidic oxygen bonds, the resulting peroxide having the ability to catalyze other unsaturated monomers to form resinous or semi-plastic products upon exposure thereof to atmospheric oxygen. In the presence of the conjunct polymers in admixture with the highly unsaturated olefinic hydrocarbon modifier, and the initial formation of the peroxidic dimers of the conjunct polymer hydrocarbons, it is also believed that polymerization and oxidation of the olefinic hydrocarbon modifier may be induced to form a "dry" film in the presence of the peroxidic compounds formed upon "drying" the conjunct polymer hydrocarbons. The mutual effect of the two components in the original drying oil mixture herein provided is therefore the formation of an ultimately dry film in which both components participate chemically toward its formation.

One object of the invention is to provide a drying oil composition for utilization in air-drying coating compositions, capable of forming a tough, abrasion-resistant adherent film upon exposure of said drying oil composition to atmospheric oxygen.

Another object of the invention is to provide a drying oil composition consisting substantially entirely of hydrocarbon components which produces a dry film upon exposure of the drying oil to atmospheric oxygen and which possesses water and alkali resistance.

One embodiment of the invention concerns a drying oil composition containing from about 20 to about 80% of a hydrocarbon drying oil comprising a mixture of polyolefinic, cyclic hydrocarbons having in their structure conjugated and non-conjugated unsaturation and recovered from a sludge formed in a conjunct polymerization reaction and from about 95 to about 20% of a normally non-drying hydrocarbon oil containing a mixture of polyolefinic hydrocarbons having molecular weights of at least 2000 and formed by a low-temperature catalyzed co-polymerization of a di-olefin and an isomono-olefin.

A more specific embodiment of the invention relates to a drying oil composition consisting of a mixture of from about 20 to about 80% of a mixture of polyolefinic, cyclic hydrocarbons recovered from a sludge formed in a conjunct polymerization reaction in which the olefinic bonds of said hydrocarbons are in conjugated and non-conjugated arrangement co-bodied at a temperature of from about 50° to about 200° C. with a normally non-drying mixture of polyolefinic hydrocarbons formed by the low-temperature catalytic co-polymerization of butadiene and isobutylene.

Other objects and embodiments of this invention relating to specific reactants, and drying oil components as well as to methods for combining the same will be hereinafter referred to in greater detail in the following further description of the invention.

The hydrocarbon component of the present drying oil composition herein referred to as a mixture of polyolefinic hydrocarbons having molecular weights of at least 2000, up to about 5000 which, individually, are non-drying upon exposure of the same to atmospheric oxygen is formed by the catalytic co-polymerization of a diolefin and a mono-isoolefin hydrocarbon at low temperatures. In accordance with the processes of the prior art relating to the preparation of these hydrocarbon mixtures, the mono-isoolefin, preferably isobutylene, or isoamylene, etc., is co-polymerized with a diolefin such as butadiene, isoprene, 2,3-dimethyl-1,3-butadiene, 1,3-pentadiene, cyclopentadiene, 2-methyl-3-isopropyl-1,3-butadiene, 2,5-dimethyl-1,3-hexadiene, 2,4-heptadiene, etc., in the presence of a Friedel-Crafts type catalyst, such as boron trifluoride, or an aluminum halide, such as aluminum chloride or aluminum bromide, at temperatures generally below about $-50°$ C., preferably at temperatures of from about $-50°$ C. to about $-100°$ C. In order to form the polyolefinic catalytic copolymers herein desired for the drying oil composition, the combined diolefin and mono-isoolefin charging stock to the co-polymerization reaction consists of at least 80% of the diolefin reactant, preferably at least 90%, up to about 97% thereof. In conducting the actual co-polymerization process, the Friedel-Crafts halide catalyst is preferably dissolved in a low boiling solvent, such as ethylene, acetone, a methyl halide, such as methyl chloride, etc., and the resulting solution added to the liquefied diolefin reactant previously cooled to the desired reaction temperature below about $-50°$ C. Within a short time thereafter, preferably within a period of time less than about 3 minutes, the mono-isoolefin is introduced into the solution of catalyst, solvent and diolefin as additional refrigerant is added to dissipate the heat of the co-polymerization reaction. When the co-polymerization reaction has continued for the desired period of time to form the present highly olefinic co-polymers having molecular weights of at least 2000 and preferably less than about 5000 (as determined cryoscopically by sampling the reaction mixture as the co-polymerization progresses) usually within a period of from about one-half to about two hours, the reaction is quenched by dumping the reaction mixture into from about ½ to about 2 volumes of a petroleum naphtha fraction, followed by the addition of a small quantity of a compound capable of forming a complex addition product with the catalyst or hydrolyzing it, such as an alkali, water, an ether, an organic acid, a low molecular weight alcohol ammonia, etc. in sufficient quantity to combine with the catalyst component of the reaction mixture to destroy its co-polymerizing effect and interrupt the co-polymerization before the formation of solid polymers. The resulting quenched mixture is then preferably washed with a solvent to remove the catalyst, such as water, and the dried hydrocarbon product distilled to remove excess reactants, catalyst solvent, and/or naphtha. Preferably, the naphtha is retained in solution with the copolymer product, since the latter is generally a highly viscous or semi-solid oleaginous material. An alternative method of operation for the formation of the polyolefinic copolymer comprises introducing the catalyst solution with the low boiling solvent into a rapidly agitated mixture of the mono-isoolefin and diolefin maintained during the addition at the selected reaction temperatures. In this operation, the catalyst-solvent solution is preferably introduced as a fine spray onto the surface of the rapidly stirred mixture of hydrocarbon monomer reactants. In both methods of preparation, rapid and intimate admixture of the addendum to the other components of the reaction mixture is a highly important factor in obtaining the desired product. The catalyst-volatile solvent solution preferably contains from about 0.5 to about 5% of the catalyst in solution and is added in an amount to provide an ultimate reaction mixture containing about 0.1 to about 2% of the catalyst therein. The co-polymer product of the reaction consists of a mixture of hydrocarbons having molecular weights of from about 2000 and preferably less than about 5000 which contain from about 60 to about 100 olefinic double bonds per molecule. The copolymers are non-volatile and of relatively viscous consistency, but their viscosity may be reduced by admixing therewith a volatile naphtha or retaining in the product the volatile naphtha introduced into the co-polymerization reaction mixture as a quenching agent. The latter naphtha enhances the ability of the mixture of copolymers to admix with the drying oil component in the formation of the composition herein provided. The naphtha may also be introduced into the ultimately recovered composition by adding the same to the original hydrocarbon reactants prior to the co-polymerization. In the latter alternative method of procedure, the ultimately recovered product consists of a mixture of the co-polymers in solution with the naphtha, which may be mixed directly with the polyolefinic cyclic hydrocarbon drying oil component to form the final composition. For this purpose, the naphtha is preferably a petroleum distillate boiling from about 125° C. to about 250° C., which readily evaporates from the drying oil composition on exposure of the latter to the atmosphere as a thin film. Other methods of producing the copolymers are clearly within the teachings of the art, although, the procedure hereinabove presented provides a copolymer product having optimum properties for utilization in the present drying oil composition.

The component of the present drying oil composition herein specified as the drying component and consisting of unsaturated conjunct polymers is characterized as a mixture of hydrocarbon of unsaturated structure, of relatively high molecular weight, above about 150, and usually of cyclic, non-aromatic structure containing conjugated as well as non-conjugated unsaturation. Hydrocarbons of the above type having drying oil properties are formed by means of the so-called "conjunct polymerization" reaction which may be effected with the intention of forming said conjunct polymers, or may be formed as an incidental by-product in certain hydrocarbon conversion processes utilizing catalyst capable of causing conjunct polymerization of the hydrocarbon reactants charge thereto, as for example, in the catalyzed alkylation of isoparaffins with olefins, in the polymerization of olefins to form higher molecular weight hydrocarbons, and other hydrocarbon conversion reactions generally known to the art. In either alternative source of the unsaturated conjunct polymers, the product is recovered from the sludge formed in the reaction, the latter containing complex addition products of the catalyst component and the unsaturated conjunct polymers, which may be subsequently recovered therefrom by subjecting the sludge to a particular type of decomposition procedure. Typical of the catalysts capable of causing said conjunct polymerization are the various Friedel-Crafts halides, such as anhydrous aluminum chloride and aluminum bromide and certain members of the mineral acids, such as concentrated sulfuric acid, and substantially anhydrous hydrogen fluoride, as well as others generally known to the art. The above catalysts, when contacted with a hydrocarbon reactant, generally a non-aromatic hydrocarbon or hydrocarbon mixture, consisting of mono- or polyolefinic and/or acetylenic hydrocarbons containing at least three carbon atoms per molecule, or a branched chain paraffin at temperatures of from about −10° C. to about 200° C., preferably from about 30° C. to about 100° C., and at a pressure sufficient to maintain the reactants in substantially liquid phase, cause conjunct polymerization among the hydrocarbon reactants, forming the aforementioned sludge as a distinct product of the reaction. Conjunct polymerization occurs in the mixture of catalyst and hydrocarbon reactant by virtue of simultaneous polymerization, cyclization and hydrogen transfer reactions between the hydrocarbons to form a mixture of relatively saturated hydrocarbons as one product of the reaction, and an accompanying product comprising high molecular weight, polyolefinic, cyclic hydrocarbon, generally referred to in the art as conjunct polymers, containing from about two to about four double bonds per molecule, of which about 70% are in conjugated relationship to each other. The unsaturated conjunct polymers, subsequently recovered from the sludge, usually have molecular weights of from about 150 to about 450 up to a maximum of about 1000 and have bromine numbers well over 100, depending upon the molecular weight of the fraction considered. The unsaturated conjunct polymers are recovered from the sludge by special methods of decomposing the hydrocarbon-catalyst addition complexes contained in the sludge in which special precautions are taken to retain the original structure and the conjugated relationship of the olefinic bonds in the unsaturated conjunct polymers by preventing condensation and interpolymerization of the hydrocarbons. One of the preferred methods of sludge decomposition comprises hydrolyzing the catalyst-hydrocarbon complexes by mixing the sludge with water accompanied by rapid stirring to dissipate the heat liberated by hydrolysis of the sludge complexes. The temperature of the hydrolytic reaction may also be controlled by effecting the hydrolysis in the presence of ice and water or by addition of a low boiling solvent, such as butane, to the reaction mixture. The conjunct polymer product rises to the top of the aqueous phase and may be recovered therefrom by simple decantation. Another method of recovering the conjunct polymers where hydrogen fluoride is utilized as the conjunct polymerization catalyst comprises heating the sludge to remove the hydrogen fluoride therefrom by distillation. Polymerization and deterioration of the conjunct polymer product, usually accompanying the thermal decomposition in the absence of special precautions, may be reduced by charging the sludge into an inert liquid hydrocarbon maintained at the desired decomposition temperature (usually from about 150° C. to about 200° C.) and removing the hydrogen fluoride vapors from contact with the liberated conjunct polymers which dissolve in the inert hydrocarbon diluent. The hydrocarbon product is thus protected from further contact with the liberated hydrogen fluoride which in its free state causes polymerization and other deterioration of the product. The latter is thereafter recovered from the diluent by fractional distillation therefrom, usually at subatmospheric pressures.

The unsaturated hydrocarbon conjunct polymer consists of a mixture of polyolefinic, cyclic hydrocarbons of generally homologous structure, the cyclic portion of the hydrocarbons having a cyclopentyl structure, in which an olefin bond present in the cyclopentene ring is in conjugation with an olefinic double bond present in an alkenyl or alkapolyenyl side chain. The mixture of hydrocarbons has a relatively broad boiling range of from about 150° C. to over 450° C., density of from about 0.83 to about 0.93, index of refraction of from about 1.47 to about 1.53, specific dispersion of from about 125 to about 175, a bromine number above about 140 (although the latter varies considerably with the average molecular weight), a maleic anhydride value of from about 30 to about 90, acid number below about 3 and molecular weights of the individual hydrocarbons in the mixture of from as low as 150 to as high as about 1000, the usual average being in the neighborhood of about 300. The highly unsaturated structure of the hydrocarbon components is believed to account for the ability of the mixture to undergo oxidative drying upon exposure to atmospheric oxygen, although their unsaturation, particularly their conjugated unsaturation, is also believed to account for the formation of brittle, flaky, non-adherent films formed by oxidative drying of the hydrocarbon mixture in the absence of modifying components. It is generally preferred to utilize the higher boiling fractions (boiling, for example, above about 250° C.) of the mixture of conjunct polymers in the present composition, since the latter fractions contain hydrocarbon components of higher molecular weight, and result in the ultimate formation of tougher films upon oxidative drying. One of the preferred fractions of the mixture of unsaturated conjunct polymers for the present drying oil composition has a boiling range of from about 250° to about 350° C.

The components of the present drying oil composition, that is, the mixture of polyolefinic, cyclic hydrocarbons or unsaturated conjunct polymers and the mixture of high molecular weight, catalytic copolymers of a diolefin and a mono-isoolefin are composited in such manner and in such proportions as to obtain an intimate homogeneous admixture of the components. In the case of some mixtures and for certain purposes, it may be desirable to heat the mixture to obtain in effect a co-bodying of said components and an increase in the viscosity of the mixture. When desired for this purpose, the mixture of hydrocarbon components is heated to a temperature of from about 50° C. to about 250° C., preferably accompanied by rapid agitation to obtain even distribution of the components throughout the composition. In general, the proportion of the unsaturated conjunct polymer hydrocarbons to the catalytic copolymer hydrocarbons is an important variable in preparing the present drying oil composition. In order to obtain a product which dries readily to a hard, tough, film which is non-tacky to the touch, the proportion of unsaturated conjunct polymers in the composition must be at least 20%; on the other hand, in order to provide a drying oil which does not become brittle upon ageing and which does not check, crack, or peel, the composition must contain at least 20% of the high molecular weight catalytic copolymer hydrocarbons. The preferred compositions, which yield the most desirable protective coatings upon drying, comprise those compositions containing at least 50% by weight of the unsaturated conjunct polymer component. In heating the mixture of hydrocarbons for thorough mixing of the present drying oil composition, it is desirable to eliminate high skin temperatures in the heating apparatus, of the static film of oil adjacent to the surface of the heating kettle. High skin temperatures, which in many cases causes discoloration of the resulting product, may be eliminated by maintaining thorough agitation in the mixture of hydrocarbons, for example, by leading an inert gas, such as nitrogen or carbon dioxide, into the drying oil mixture through a conduit attached to the bottom of the heated kettle containing said mixture.

Compounds which enhance the film forming properties of the drying oils, the so-called "driers" of art, may be incorporated into the present composition during the compositing procedure to form a product, having an accelerated rate of drying when utilized in paint, varnish, lacquer, and other specific coating compositions. The driers of art utilizable in the present drying oil are characterized generally as certain metallic salts of high molecular weight organic acids, such as the long chain fatty acids, the rosin acids, and the naphthenic acids, as well as certain inorganic compounds which have a catalytic effect on the drying rate of the oil when incorporated into the composition. Certain salts of such metals as cobalt, manganese, iron, nickel, vanadium, lead, zinc, etc., are useful and effective driers, especially the resinates, naphthenates, linoleates, or a combination of salts of said metals when present in the drying oil composition in amounts of from about a few thousandths of one percent to a few tenths of one percent of the metal. When utilizing driers in the composition, the proportion of the polyolefinic, high molecular weight catalytic copolymer modifying component may be increased above the ratio thereof to the unsaturated conjunct polymers in the compositions hereinabove specified containing, in general, a maximum of about 20% by weight of the catalytic copolymer therein. Thus, for example, in a composition containing about 0.01 to about 0.05% of a cobalt drier, the proportion of catalytic copolymer components may be increased up to as high as 95% of the composition and the dried film obtained therefrom nevertheless possesses toughness, elasticity, and is tack free, although in the absence of said drier, the maximum content of the catalytic copolymer hydrocarbons in the drying oil composition is generally up to about 80%, as hereinabove specified.

The invention is further illustrated in the following examples which relate to the production of the individual drying oil components and to specific drying oil compositions. In thus specifying particular embodiments of the present invention, it is not intended thereby to limit the generally broad scope thereof in strict accordance to the specific compositions provided therein.

*Example I*

A mixture of polyolefinic cyclic hydrocarbons or unsaturated conjunct polymers was prepared by means of a conjunct polymerization reaction in which a $C_8$ to $C_{12}$ fraction of a copolymer gasoline (the product of the mixed polymerization of propylene and butylene monomers) was reacted with substantially anhydrous liquid hydrogen fluoride to form a sludge phase and a relatively saturated hydrocarbon phase, hydrolized by the addition of the separated sludge to a mixture of ice and water and the unsaturated hydrocarbon phase resulting therefrom recovered from the aqueous phase. In this reaction, 22 liters (16.5 kg.) of the copolymer charging stock (having a bromine number of about 162 and containing monoolefinic hydrocarbons varying in molecular weight from octene to dodecalene) was charged into a pressure autoclave and rapidly stirred as 9.0 kg. of liquid anhydrous hydrogen fluoride was introduced into the reactor. The pressure was maintained at approximately 205 lbs/sq. in. and the temperature at about 91° C. as stirring was continued for an additional one hour. The upper layer hydrocarbon phase was decanted from the lower acidic sludge layer and the latter reserved for the hydrolysis stage of the process.

5000 grams of the above sludge was allowed to flow into a mixture of ice and water, additional ice being added as the heat of reaction warmed the mixture during the hydrolysis. 2170 grams of a light-colored, sweet-smelling oil separated from the aqueous phase, a yield of 42.2% based on the weight of the original olefin charged to the conjunct polymerization reaction. An examination of the oil indicated that it possessed the following properties:

Boiling range, 160° to above 450° C.
Density, $d^{20}{}_4$, 0.863
Color, Gardner, 12-13
Molecular weight, average, 304
Diene number, 85
Bromine number, 195
Double bonds per molecule, average, 3.2

Although the above hydrocarbon unsaturated conjunct polymers were prepared from a hydrogen fluoride sludge and was recovered therefrom by an aqueous hydrolysis procedure, a similar material may be obtained from an aluminum chloride or sulfuric acid sludge prepared similarly and the conjunct hydrocarbon polymers may be also recovered from the hydrogen fluoride sludge by thermal decomposition methods, as for example, by flash distillation of the hydrogen fluoride from the residual conjunct polymers.

The unsaturated conjunct polymers as recovered from the hydrogen fluoride sludge when spread in a thin film and exposed to atmospheric oxygen dried in about 72 hours and upon continued exposure, formed a tack-free film, which however, was very brittle and had little abrasion resistance. The dried film, for example, when tested by the standard mandrel flexibility test, underwent only 5% elongation and when exposed to the standard Weatherometer test, the film checked and peeled badly after only 25 hours on test under the accelerated weathering conditions.

A catalytic copolymer oil was prepared by the co-polymerization of butadiene and isobutylene in the presence of aluminum chloride as catalyst at a low temperature. A liquid mixture of 92 parts by weight of butadiene and 8 parts by weight of isobutylene, cooled to approximately −70° C. by means of an acetone-Dry Ice batch was rapidly stirred as a solution of 5 parts by weight of aluminum chloride dissolved in 10 parts by weight of liquid propane was gradually introduced into the rapidly stirred mixture of olefinic hydrocarbons. The reaction mixture was maintained at the above temperature and was stirred for approximately 30 minutes and was then added to 80 parts by weight of a naphtha boiling from about 125° C. to about 150° C. The resulting mixture was then stirred as 10 parts by weight of water was added thereto, which hydrolyzed the aluminum chloride catalyst and terminated the polymerization reaction. The aqueous phase containing the hydrolyzed aluminum chloride was decanted from the upper layer hydrocarbon phase and the latter washed successively with two volume proportions of water in three successive washings. The recovered hydrocarbon phase from which the propane had largely evaporated during the prior treatment had a bromine number of 205. The naphtha component could be removed by distillation therefrom, leaving a residue comprising a viscous oleagenous material having a bromine number of approximately 348. A sample of the oil when sprayed on a test panel and exposed to atmospheric oxygen for twenty days was tacky and incompletely dried after expiration of the test period.

A fraction boiling from about 325° C.–335° C. was separated from the mixture of unsaturated conjunct polymers prepared in the conjunct polymerization reaction and mixed with an equal volume of the catalytic copolymer oil. The mixture was heated to 100° C. for one minute, and when cooled, it was spread as a thin film on a test panel. The film dried without drier in about 14 days, producing a tough, non-brittle and non-tacky, substantially colorless film following the above test. When subjected to an accelerated weathering test in a standard Weatherometer procedure, the film showed no tendency to crack or peel and underwent no color changes after 130 hours on test. The same composition containing approximately 0.01% cobalt naphthenate drier formed a tack-free, tough, flexible film within 2 days exposure of the film to atmospheric oxygen.

*Example II*

A mixture containing 9 parts by weight of the 325–335° C. fraction of the conjunct polymer hydrocarbons and one part by weight of the catalytic copolymer hydrocarbons co-bodied at a temperature of about 220° C. for one minute dried to a brittle film in four days with drier added and in 7 days in the absence of a drier.

*Example III*

A mixture containing 9 parts by weight of the catalytic copolymer oil and 1 part by weight of the 325–335° C. fraction of the unsaturated conjunct polymers co-bodied at 220° C. for one minute formed a tacky film upon exposure of the composition to atmospheric oxygen for 20 days. In the presence of a drier added to the composition, the film dried to a non-tacky, tough, flexible film in 4 days. The latter film, when subjected to a weathering test by the standard Weatherometer procedure, showed no tendency to check, peel, or undergo color changes after 130 hours on test.

I claim as my invention:

1. A drying oil composition comprising (1) from about 20% to about 95% of a normally non-drying hydrocarbon oil containing a mixture of polyolefinic hydrocarbons having molecular weights of at least 2000 and formed by a low temperature catalyzed co-polymerization of a di-olefin and a mono-iso-olefin, and (2) from about 5% to about 80% of a mixture of polyolefinic cyclic hydrocarbons recovered from a sludge formed in a conjunct polymerization reaction and having in their structure conjugated and non-conjugated unsaturation in which the conjugated unsaturation predominates.

2. The composition of claim 1 further characterized in that said mixture of polyolefinic cyclic hydrocarbons has a boiling point above about 150° C., a bromine number above about 140 and a maleic anhydride value of from about 30 to about 90.

3. The composition of claim 1 further characterized in that said normally non-drying hydrocarbon oil and said mixture of polyolefinic cyclic hydrocarbons are co-bodied at a temperature of from about 50° C. to about 250° C.

4. The composition of claim 1 further characterized in that said mixture of polyolefinic cyclic hydrocarbons is a fraction of conjunct polymers boiling between about 250° C. and about 350° C.

5. The composition of claim 1 further characterized in that the composition contains a small amount, up to about 0.5%, of a drier.

6. The composition of claim 5 further characterized in that said drier is cobalt naphthenate.

7. A drying oil composition comprising (1) from about 20% to about 95% of a normally non-drying hydrocarbon oil containing a mixture of polyolefinic hydrocarbons having molecular weights of at least 2000 and formed by a low temperature catalyzed co-polymerization of a di-olefin and a mono-iso-olefin, and (2) from about 5% to about 80% of a mixture of polyolefinic cyclic hydrocarbons recovered from a sludge formed in a conjunct polymerization reaction, the last-named hydrocarbons having average molecular weights between about 300 and about 450 and containing from about 2.5 to about 4 olefinic double bonds per molecule of which about 70% are in conjugated relationship to each other.

8. The composition of claim 7 further characterized in that said normally non-drying hydrocarbon oil and said mixture of polyolefinic cyclic hydrocarbons are co-bodied at a temperature of from about 50° C. to about 250° C.

JAMES P. WEST.

REFERENCES CITED

The following references are of record in the file of this patent:

UNITED STATES PATENTS

| Number | Name | Date |
|---|---|---|
| 2,267,360 | Albrecht | Dec. 23, 1941 |
| 2,440,459 | Bloch | Apr. 27, 1948 |
| 2,442,644 | Elwell et al. | June 1, 1948 |